United States Patent
Ohm et al.

(10) Patent No.: US 8,848,605 B2
(45) Date of Patent: Sep. 30, 2014

(54) SYSTEMS AND METHOD FOR PROVIDING IN-FLIGHT BROADBAND MOBILE COMMUNICATION SERVICES

(75) Inventors: Michael Ohm, Stuttgart (DE); Thorsten Wild, Stuttgart (DE); Michael Schmidt, Stuttgart (DE)

(73) Assignee: Alcatel Lucent, Boulogne-Billancourt (FR)

(*) Notice: Subject to any disclaimer, the term of this patent is extended or adjusted under 35 U.S.C. 154(b) by 371 days.

(21) Appl. No.: 13/002,185

(22) PCT Filed: Jul. 23, 2009

(86) PCT No.: PCT/EP2009/059465
§ 371 (c)(1),
(2), (4) Date: Mar. 21, 2011

(87) PCT Pub. No.: WO2010/025997
PCT Pub. Date: Mar. 11, 2010

(65) Prior Publication Data
US 2011/0182230 A1 Jul. 28, 2011

(30) Foreign Application Priority Data

Sep. 4, 2008 (EP) .................................. 08290831
Nov. 10, 2008 (EP) .................................. 08291050
Jun. 12, 2009 (EP) .................................. 09290443

(51) Int. Cl.
*H04W 4/00* (2009.01)
*H04B 7/26* (2006.01)
*H04B 7/185* (2006.01)

(52) U.S. Cl.
CPC .............. *H04B 7/18506* (2013.01); *H04B 7/26* (2013.01); *H04B 7/185* (2013.01)
USPC ........... 370/328; 370/315; 370/338; 370/334; 370/400; 455/431; 455/11.1; 455/187.1; 455/422.1; 455/427; 455/517; 455/12.1

(58) Field of Classification Search
CPC ..... H04W 4/00; H04W 84/02; H04W 84/005; H04W 84/042; H04W 84/06; H04W 84/12; H04W 88/06
See application file for complete search history.

(56) References Cited

U.S. PATENT DOCUMENTS

| | | | |
|---|---|---|---|
| 6,377,802 B1 | 4/2002 | McKenna et al. | |
| 6,788,935 B1 * | 9/2004 | McKenna et al. | 455/431 |
| 2004/0095907 A1 * | 5/2004 | Agee et al. | 370/334 |
| 2006/0199532 A1 * | 9/2006 | Soliman | 455/20 |
| 2008/0069058 A1 * | 3/2008 | Geng et al. | 370/336 |
| 2008/0085691 A1 * | 4/2008 | Harvey et al. | 455/187.1 |

FOREIGN PATENT DOCUMENTS

| | | |
|---|---|---|
| WO | WO 99/45609 A | 9/1999 |
| WO | 2005011176 A2 | 2/2005 |
| WO | WO 2007/011978 A | 1/2007 |

OTHER PUBLICATIONS

International Search Report for PCT/EP2009/059465 dated Oct. 22, 2009.

* cited by examiner

*Primary Examiner* — Ian N Moore
*Assistant Examiner* — Eric H Wang
(74) *Attorney, Agent, or Firm* — Fay Sharpe LLP

(57) ABSTRACT

The disclosure relates to a ground-based wireless cellular communication system providing in-flight broadband mobile communication services. The system includes at least one ground-based base station adapted for generating at least one cell defining a solid angle of space surrounding the base station. The ground-based base station includes an antenna array using two-dimensional-beamforming for generating at least one beam for serving at least one airplane in the space covered by the at least one cell using spatial-division multiple access (SDMA). The disclosure also relates to an airplane equipment for providing in-flight broadband mobile communication services. The airplane equipment includes an antenna for exchange of user data with the ground-based wireless cellular communication system, a transceiver unit connected to the antenna for handling the air-to-ground and ground-to-air communication with the ground-based wireless cellular communication system, and an inside-airplane communication system for distributing the user data to and from terminals within the airplane.

22 Claims, 1 Drawing Sheet

SYSTEMS AND METHOD FOR PROVIDING IN-FLIGHT BROADBAND MOBILE COMMUNICATION SERVICES

This application is a U.S. national filing of PCT Application No. PCT/EP/2009/059465 and is based on and claims priority to priority applications EP 08290831.0, filed Sep. 4, 2008, EP 08291050.6, filed Nov. 10, 2008 and, EP 09290443.2, filed Jun. 12, 2009, all of which are incorporated herein by reference in their entirety.

BACKGROUND OF THE INVENTION

The invention relates to a ground-based wireless cellular communication system, to an airplane equipment being adapted to provide in-flight broadband mobile communication services, as well as to a corresponding method. The invention also relates to a communication system comprising such a ground-based wireless cellular communication system and at least one such airplane equipment.

For efficiently providing broadband (and/or narrowband) communication services to airplanes (to be used by passengers, crew, and/or for automatic exchange of (airline) operational data), spectrum efficiency in the ground-to-air and air-to-ground communication should be high to offer real broadband services and to keep the number of ground-based base stations and/or required transmission resources (e.g. licensed spectrum) low while serving a large number of airplanes at the same time. Moreover, airplane passengers should be enabled to use their own regular communication devices (phones, laptop cards, etc.) for performing the broadband communication.

For providing such an in-flight broadband communication, a satellite-based system may be used, relying on communication with satellites in geostationary orbits. However, such a system is expensive and typically has very high latency, thus having a negative impact on service quality. Moreover, existing L-band solutions do not offer the capacity required for upcoming air traffic demands.

A better solution would be a ground-based cellular system that uses base station antennas with broad main lobes in the antenna characteristics to cover large portions of the sky. The multiple-access scheme for serving a number of airplanes would be a time-division multiple-access (TDMA) scheme, or a frequency-division multiple-access (FDMA) scheme, or a combination of both. However, these multiple-access schemes do not account for the spatial separation of the served airplanes within one cell. Thus, these schemes do not reach the theoretically possible spectrum efficiency.

OBJECT OF THE INVENTION

It is an object of the invention to provide efficient in-flight broadband mobile communication services for airplanes.

SUMMARY OF THE INVENTION

One aspect of the invention is implemented in a ground-based wireless cellular communication system for providing in-flight broadband mobile communication services, comprising: at least one ground-based base station adapted for generating at least one cell defining a solid angle of the space surrounding the base station, the ground-based base station further comprising at least one antenna array using two-dimensional-beamforming for generating at least one beam for serving at least one airplane in the space covered by the at least one cell using spatial-division multiple access, SDMA.

The inventive ground-based communication system makes use of the spatial separation of the served airplanes by using two-dimensional beamforming at the ground-based base stations. The term "two-dimensional beamforming" refers to beamforming in two out of the three spherical coordinates, i.e. in the azimuth and elevation direction, whereas conventional (one-dimensional) beamforming is restricted to only one spherical coordinate (azimuth). Thus, in addition to conventional TDMA and FDMA, two-dimensional beamforming enables spatial-division multiple-access (SDMA), i.e. spatial reuse of the available transmission resources within one cell, improving the average as well as the peak data throughput per cell. Further, the two-dimensional beamforming leads to a beamforming gain for the receiver signal-to-noise-and-interference ratio (SINR) in both the ground-to-air and air-to-ground direction, and the data throughputs of the individual links are also improved.

The basis of the ground-based mobile communication system is given by a set of base stations of the type described above spread over the service area. Each base station may serve several sectors (cells) of the space above and around it defined by some solid angle. Such an arrangement is very similar to common cellular mobile communication systems (e.g. GSM, UMTS, LTE), where however the mobile users are more or less distributed on a surface compared to the mobile users (airplanes) of the present communication system which are distributed in three-dimensional space.

In one embodiment, the ground-based base station is adapted to form beams, in particular adaptive beams, for tracking the current position of the airplanes. For the system described herein, airplane-specific adaptive beams are the preferred beamforming technique. However, a two-dimensional grid-of-beams technique where one momentarily preferred beam out of a predefined set of available beams is repeatedly selected is also possible for tracking the airplane's current position. In any case, it can be assured that each beam is directed only to the airplane which has to be served.

In a further embodiment, the system comprises a gateway for connection to a core (computer) network, such as the internet. Depending on the architecture of the ground-based mobile communication network, the base stations are connected to each other or to controllers for backhauling of data and signaling. The base stations or the controllers should further be connected to the core network by some gateway for providing broadband access. Again, this is very similar to common cellular mobile communication systems.

It will be understood that the ground-based wireless cellular communication system may be a network using a dedicated infrastructure, or may be an overlay network of an existing ground-based cellular network, in the latter case not all of the ground-based base stations of the system being necessarily adapted to perform two-dimensional beamforming. For instance, a conventional cellular network technology such as WiMAX or LTE may be provided with a number of base stations/antenna arrays having two-dimensional beamforming capability, the base stations being arranged e.g. only at specific locations of the network, each of these "enabled" base stations covering a large radius (cell size) of e.g. 150 km, the other base stations having a cell size of e.g. 1 to 5 km. For example, arranging only nine such base stations in major German cities would allow providing in-flight broadband access to the entire air space over Germany.

A further aspect is implemented in an airplane equipment for providing in-flight broadband mobile communication services, comprising: at least one antenna for exchange of user data with a ground-based wireless cellular communication system, in particular of the type described above, a transceiver unit connected to the at least one antenna for handling the air-to-ground and ground-to-air communication with the ground-based wireless cellular communication system, an inside-airplane communication system, in particular of a wireless type, for distributing the user data to and from terminals within the airplane, and an inter-communication unit for communication between the transceiver unit and the inside-airplane communication system. Such an airplane equipment may be used for performing the task of distributing the user data of the ground-to-air and air-to-ground communication to the terminals (used e.g. by passengers) within the airplane. Both for the antenna system and for the inside-airplane communication system, a plurality of implementations are possible:

For ease of use by the passengers, an inside-airplane wireless communication system is of advantage, but not required. In particular, for providing crew and airline operational services, a wire-line communication system may be sufficient. The person skilled in the art will readily recognize that the type of in-cabin distribution system (wireless or wire-line) does not have an influence on the communication with the ground-based communication system. It will also be understood that the antenna for handling the communication with the ground-based wireless cellular communication system is typically adapted to both transmit and receive data over the air-to-ground and ground-to-air link, respectively.

It will also be understood that the wireless communication system with which the airplane equipment, respectively the antenna, is adapted to communicate need not necessarily be adapted for performing two-dimensional beamforming; in fact, the ground-based wireless communication system may not be adapted for performing beamforming at all. In particular, the ground-based communication system with which the airplane equipment communicates may be based on a conventional cellular network technology such as WiMAX or LTE, preferably being adapted for performing one-dimensional beamforming.

In one embodiment, the at least one antenna is arranged outside of a (typically conductive) hull of the airplane, and the inside-airplane wireless communication system is arranged inside the hull of the airplane. Thus, effective separation of the air-to-ground, resp., ground-to-air communication and the inside-airplane wireless communication may be performed. It will be understood that for providing the data to the passenger terminals, the communication system inside the aircraft may comprise at least one further antenna being arranged inside of the hull of the aircraft.

In a further embodiment, the antenna for the exchange of user data with the ground-based wireless cellular system is a mechanically steered directive antenna or a two-dimensional beamforming antenna array adapted for automatic tracking of the ground-based base stations. The antenna may be implemented as a mechanically steered directive antenna with high antenna gain, providing automatic tracking of the serving ground-based base stations, or as a two-dimensional beamforming antenna array providing beamforming gain and automatic tracking of the ground base stations. The latter approach may be preferred if more than one ground-based base station shall be monitored for e.g. handover measurements. Alternatively, a first mechanically steered directive antenna with high antenna gain and with automatic tracking of the serving ground base station may be complemented by a second mechanically steered directive antenna with high antenna gain and with automatic tracking of the ground base station selected for a handover. The person skilled in the art will appreciate that the antenna may alternatively be implemented as a simple non-directive antenna with only low antenna gain, as the two-dimensional beamforming at the ground-based base station antenna array provides enough gain. The latter approach may be preferred if more than one ground-based base station shall be monitored for e.g. handover measurements.

In one embodiment, the inside-airplane communication system is a cellular system which comprises at least one airborne base station for generating a (pico) cell inside the airplane. In this case, the data exchanged between the ground-based base stations and the mobile airplane transceiver unit may consist of multiplexed data for the terminals inside the airplane and of signaling both related to the terminals and to the airplane transceiver units. Then, the key point is that the data carried on the ground-to-air and air-to-ground links is a multiplex of the data for the individual users (passengers, crew, etc.) inside the airplane, i.e., inside the airplane, the user data has to be de-multiplexed and distributed to the terminals using the inside-airplane communication system.

In one improvement, the inside-airplane cellular wireless communication system is compatible with at least one communication standard of the (mobile) passenger, crew and/or airline operational terminals, in particular selected from the group consisting of: GSM, UMTS, and LTE. This is advantageous as, in this case, the passengers may use regular devices which they also use within conventional land-based mobile communication systems.

In a further embodiment, the inside-airplane wireless communication system is a non-cellular wireless communication system, in particular a WLAN system. In this case, the data is distributed to and from the terminals in a potentially unlicensed spectrum such as the WLAN spectrum.

In another embodiment, the inside-airplane wireless communication system comprises a plurality of airplane operator-owned terminals being installed inside the airplane. In this case, broadband services can be offered to the passengers or the crew by means of the airplane operator-owned terminals installed inside the airplane. Such terminals may for example be integrated into the airplane seats as part of the airplane entertainment system.

In a further embodiment, the inside-airplane wireless communication system comprises a relay station In this case the (mobile) passenger terminals are directly connected to the ground-based base station-based macro cell via a relay station, with one hop going from the ground-based base station to a relay antenna outside of the conductive hull of the airplane, a wired connection into the (conductive) hull and another hop from an antenna inside the conductive hull to the terminals and vice versa. This relay may also use signal-processing techniques in order to improve the signal quality, as standard terminals may not be able to cope with high Doppler frequencies, stemming from velocities of e.g. 900 km/h.

In a further embodiment, the airplane equipment is adapted for performing Doppler compensation and/or frequency translation of the signals received and transmitted by the at least one antenna, preferably using airplane movement data, in particular provided by a GPS receiver or a navigation system of the airplane.

In the downlink ground-to-relay-hop, the airplane equipment, for example the relay station, receives the data and has two options: a) Receiving, Doppler estimation, Doppler compensation, potentially frequency translation, amplifying and forwarding to the relay-to-terminal hop, or b) receiving, complete decoding, including the above-mentioned Doppler estimation and Doppler compensation plus re-encoding, potentially frequency translation, amplifying, and forwarding to the relay-to-terminal hop. Likewise, in the uplink of the terminal-to-relay hop the relay again has two options: a) Receiving, Doppler Pre-compensation (e.g. using the estimated Doppler shift from the downlink), potentially frequency translation, amplifying and forwarding or b) receiving, complete decoding, re-encoding, including Doppler pre-compensation (e.g. using the estimated Doppler shift from the downlink), potentially frequency translation, amplifying and forwarding.

A frequency translation may be required if the ground-to-air/air-to-ground link and the in-cabin link use two different center frequencies (which may be the case in some actual implementations). However, frequency translation is not required if the air-to-ground/ground-to-air link and the in-cabin link use the same center frequencies.

In all of the embodiments described above, the inside-airplane wireless communication system may be adapted to use airplane movement data, preferably provided by a GPS receiver or by a navigation system of the airplane. In this case, the airplane equipment is adapted to retrieve airplane movement data such as course, speed, etc. from devices storing this information inside the airplane. Of course, the airplane movement data may also be of interest for the ground-based wireless communication system and thus may be transmitted from the airborne wireless communication system to the ground-based wireless communication system using the air-to-ground link.

The airplane movement data thus provided may be very interesting at least for the following tasks: signal processing, e.g. Doppler compensation either at the transmitter or receiver (both in the ground-to-air and in the air-to-ground link, Doppler compensation is either pre-compensation or post compensation); two-dimensional beamforming and tracking of the ground-based base stations (air-to-ground link) or the airplanes (ground-to-air link), and, last but not least, for implementing handover mechanisms.

A further aspect of the invention relates to a communication system comprising a combination of a ground-based wireless cellular communication system as described above and at least one airplane equipment as described above. Such a communication system allows to provide in-flight broadband mobile communication services to airplanes in a cost-effective way.

In a preferred embodiment, the ground-based base stations and the transceiver units are adapted to exchange multiplexed user data. In this case, the inside-airplane wireless communication system is adapted for distributing the user data to the individual terminals by using appropriate signaling and de-multiplexing of the user data.

A further aspect of the invention is implemented in a method for providing in-flight broadband mobile communication services, comprising: using two-dimensional-beamforming in an antenna element array of a ground-based base station to generate at least one beam for serving at least one airplane in the space covered by at least one cell of the base station using spatial-division multiple access, SDMA. The two-dimensional beamforming of the inventive method leads to a beamforming gain for the receiver signal-to-noise-and-interference ratio (SINR) in both the ground-to-air and air-to-ground direction, and the data throughputs of the individual links are also improved. It will be understood that the inventive method of providing the two-dimensional beamforming may be implemented in a computer program product, the latter being a suitable software or hardware, in particular a field programmable gate array (FPGA) or an application-specific integrated circuit (ASIC) or a digital signal processor (DSP).

Further features and advantages are stated in the following description of exemplary embodiments, with reference to the figures of the drawing, which shows significant details, and are defined by the claims. The individual features can be implemented individually by themselves, or several of them can be implemented in any desired combination.

BRIEF DESCRIPTION OF THE DRAWINGS

Exemplary embodiments are shown in the diagrammatic drawing and are explained in the description below. The following are shown.

DETAILED DESCRIPTION OF PREFERRED EMBODIMENTS

Figure 1:
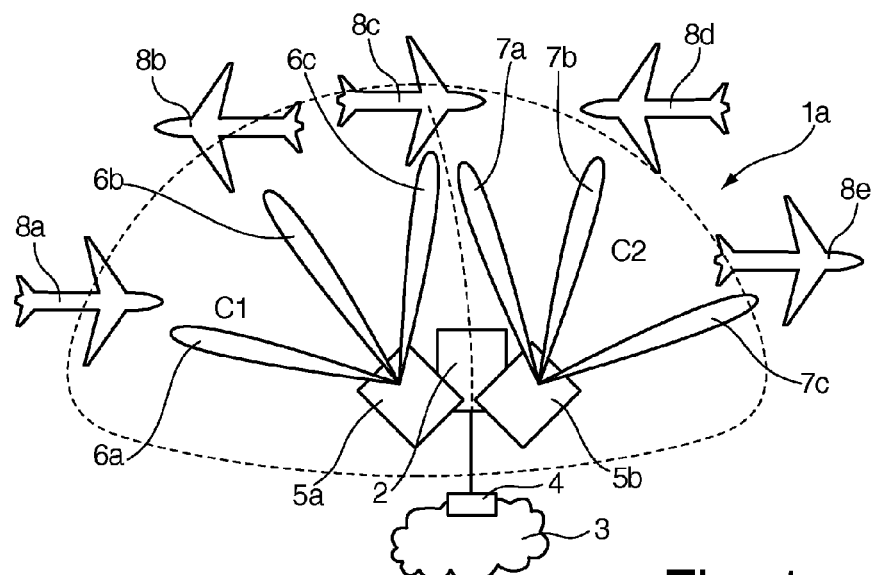
FIG. 1 shows a schematic diagram of an embodiment of a ground-based communication system using two-dimensional beamforming.

FIG. 1 shows a ground-based base station 2 of a ground-based wireless cellular communication system 1a. The ground-based base station 2 may be connected to further base stations (not shown) of the ground-based communication system 1a which spread over the service area of the ground-based communication system 1a. Depending on the architecture of the ground-based wireless communication system/network, the base stations are interconnected or connected to controllers for backhauling of data and signaling. For providing access to a computer network, the ground-based base station 2 is connected to a core (computer) network 3 by a gateway 4. In this respect, the ground-based communication system 1a is very similar to common cellular mobile communication systems. It will be understood that instead of a computer network for data traffic, a voice network for voice traffic may be provided. Of course, voice communications may be treated as data, for example when using Voice over IP.

However, the ground-based wireless communication system 1a differs from conventional cellular mobile communication systems in that the base station 2 comprises two antenna element arrays 5a, 5b which are capable of two-dimensional beamforming. For this purpose, the antenna element arrays 5a, 5b are arranged both vertically and horizontally, whereas conventional antenna element arrays are typically vertically stacked, such that complex antenna weights can only be applied to a complete vertical antenna element stack, allowing beamforming only in the azimuth direction. In contrast thereto, the antenna element arrays 5a, 5b allow for two-dimensional beamforming both in the azimuth and elevation direction of a spherical coordinate system.

Each antenna array 5a, 5b serves a cell C1, C2 (i.e. a sector) of the base station 2, the cells C1, C2 defining non-overlapping solid angles of the space surrounding the base station 2. For the present applications, the cell size, i.e. the radius of the cells C1, C2 may be of the order of 50 km or more.

The base station 2 is adapted to perform signal processing algorithms using antenna weights in order to form beams 6a-c, 7a-c which are directed into the azimuth and elevation directions of served airplanes 8a-e, the base station 2 being further adapted to perform SDMA scheduling algorithms in order to take advantage of the spatial separation of the airplanes 8a-e.

In the example of FIG. 1, the airplanes 8a-c are all served in cell C1 on the same time/frequency resources, but on different non-interfering airplane specific beams 6a-c (space resources). In cell C2, the airplanes 8c-d are served on the same time/frequency resources but again on different non-interfering airplane-specific beams 7a-7c. In this example, the third airplane 8c is served by both cells C1 and C2, as it is in a handover state between both cells C1, C2. In addition to SDMA, the scheduling algorithm of the base station 2 may also use conventional Time Division Multiple Access or Frequency Division Multiple Access for an optimal resource usage.

The beams 6a-c, 7a-c are formed in such a way that they track the current positions of the airplanes 8a-c. The tracking may be performed by generating airplane-specific adaptive beams 6a-c, 7a-c using (complex) antenna weights which are dynamically adapted to the position of the airplanes 8a-e. Alternatively, a two-dimensional grid-of-beams technique where one momentarily preferred beam out of a pre-defined set of available (fixed) beams is selected in dependence of the position of the served airplane 8a-e may also be applied.

In the following, the link between the base station 2 of the ground-based wireless communication system 1a to the first airplane 8a in the (macro) cell C1 will be described with reference to FIG. 2. The airplane 8a comprises an airplane equipment 1b having a transmit and receive antenna 9 which is implemented as a mechanically steered directive antenna adapted for generating a directed beam 10 which automatically tracks the ground-based base station C1. It will be understood that instead of one, two mechanically steered antennas or another two-dimensional beamforming antenna array may be used, which is particularly useful when a handover between two base stations has to be performed. Also, a simple non-directive transmit and receive antenna 9 with only low antenna gain may be used, in case that the two-dimensional transmit and receive beamforming of the antenna array 5a of the ground-based base station 2 provides sufficient gain.

The airplane equipment 1b further comprises a transceiver unit 11 connected to the transmit and receive antenna 9 for handling the air-to-ground and ground-to-air communication with the base station 2 of the ground-based wireless cellular communication system 1a of FIG. 1. Moreover, the airplane equipment 1b comprises an inside-airplane communication system 12 for distributing the user data to and from passenger terminals 13a-c within the airplane 8a, as well as an inter-communication unit 14 for communication between the transceiver unit 11 and an airborne base station 15 of the inside-airplane wireless communication system 12. The airborne base station 15 is connected to a inside-airplane antenna 16 for transmission of user and signaling data to and from the mobile passenger terminals 13a-c. It will be understood that alternatively or in addition to wireless in-cabin distribution of data by the communication system 12, wire-line distribution may also be used, e.g. for terminals used by the crew or by operational services.

For separating the ground-to-air and air-to-ground link 6a, 10 of the ground-based wireless cellular communication system 1a from the inside-airplane wireless communication system 12, the receive and transmit antenna 9 and the transceiver unit 11 are arranged outside of a hull 17 of the airplane 8a, whereas the base station 15 an the further antenna 16 of the inside-airplane distribution system 12 are arranged inside the (possibly not fully conductive) hull 17 of the airplane 8a. It will be understood that alternatively or in addition, both wireless systems may be separated by using two different frequency ranges for the inside-airplane communication system 12 and the Air-to-Ground/Ground-to-Air link. In the latter case, the airplane equipment 1b, in particular the inter-communication unit 14, may be adapted for performing a frequency translation between the center frequencies of the different systems.

Figure 2:
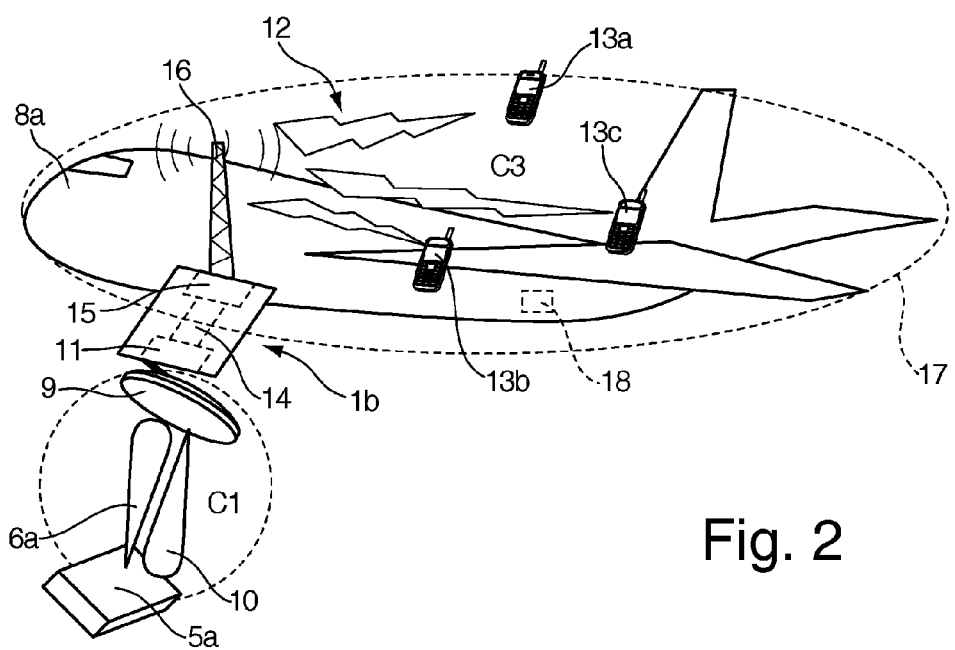
FIG. 2 shows an embodiment of an airplane equipment for broadband communication between a ground-based base station and an inside-airplane distribution system.

In the example of FIG. 2, the transceiver unit 11, the airborne base station 15 and the inter-communication unit 14 are co-located within one common box, forming the airplane equipment 1b together with the antennas 9, 16. However, the person skilled in the art will appreciate that the actual configuration of the airplane equipment 1b depends on installation restrictions given by the airplane construction.

The data exchanged between the ground-based base station 2 and the mobile airplane transceiver unit 11 consists of multiplexed data for the passenger terminals 13a-c inside the airplane 8a and of signaling both related to the passenger terminals 13a-c and to the airplane transceiver unit 11. The key point here is that the data carried on the ground-to-air and air-to-ground links is a multiplex of the data for the individual users (passengers) inside the airplane 8a, i.e. inside the airplane 8a, the data has to be distributed to the passenger terminals 13a-c. As these passenger terminals are typically the passengers' regular devices that they also use within conventional land-based mobile communication systems, the wireless distribution system 12 inside the airplane 8a should be compatible to at least one commonly used wireless system standard such as GSM, UMTS or LTE. The service provisioning inside the airplane 8a is thus achieved by the use of the airborne base station 15 creating a pico cell C3 inside the aircraft 8a.

The person skilled in the art will appreciate that alternatively, the inside-airplane wireless communication system 12 may be devised as a non-cellular wireless communication system transmitting and receiving in a potentially unlicensed spectrum, in particular a WLAN system. Also, instead of serving passenger-owned terminals which are compatible with a common cellular or non-cellular wireless communication system, broadband services may be offered to the passengers by means of airplane-operator owned terminals installed inside the airplane 8a. Such terminals may for example be integrated into the airplane seats as part of the airplane entertainment system.

Also, instead of using a pico-cell airborne base station 15 in the airplane 8a and performing multiplexing/demultiplexing of user data, the mobile terminals 13a-c may be directly connected to the ground-based base station-based macro cell C1 via a relay station 15, being used instead of the base station of the airplane equipment 1b shown in FIG. 2. In this case, one hop is going from the ground-based base station 2 to the relay antenna 9 outside of the conductive hull 17, a wired connection being provided for transmitting the data into the conductive hull 17, another hop being provided by the antenna 16 inside the conductive hull 17 to the terminals 13a-c and vice versa. The relay station 15 also uses signal-processing techniques in order to improve the signal quality, as standard terminals might not be able to cope with high Doppler frequencies, stemming from velocities of e.g. 900 km/h.

In all of the embodiments described above, the inside-airplane wireless communication system 12 may be adapted to use airplane movement data, preferably provided by a GPS receiver 18 or by a navigation system of the airplane 8a. In this case, the airplane equipment 1b may be adapted to use the airplane movement data such as course, speed, etc., e.g. in order to calculate the Doppler frequency. Moreover, the airplane movement data may also transmitted to the ground-based wireless communication system 1a using the air-to-ground link.

The airplane movement data thus provided may also be used for the following tasks: signal processing, e.g. Doppler compensation either at the transmitter or receiver (both in the ground-to-air and in the air-to-ground link); two-dimensional beamforming and tracking of the ground base stations (air-to-ground link) or the airplanes (ground-to-air link), and also for implementing handover mechanisms.

The person skilled in the art will appreciate that the in-flight broadband mobile communication services as described herein are not limited to high-speed internet access, voice and messaging, but may also encompass security applications, such as cabin video surveillance, real-time exchange of flight and airplane data, e.g. for forming a ground-based "black box", and logistic applications, e.g. monitoring of freight, monitoring of passenger luggage ("lost luggage tracking"). Moreover, airplanes equipped with the broadband link to the ground-based network may also be used as a sensor network, e.g. providing metrological data to the ground-based wireless cellular communication system 1a.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as defined by the appended claims, and equivalents thereof.

The invention claimed is:

1. A ground-based communication system for providing in-flight broadband mobile communication services, comprising:
   at least one ground-based base station configured to generate at least one cell forming a three-dimensional space above and around the ground-based base station, the ground-based base station further comprising
      at least one antenna array configured to use two-dimensional-beamforming to generate at least one beam defining the at least one cell for serving at least one airplane in the space covered by the at least one cell using spatial-division multiple access, SDMA,
   wherein the ground-based base station is configured to track the at least one airplane using the at least one beam generated by the two-dimensional-beamforming;
   wherein the at least one beam generated by the two-dimensional-beamforming comprises airplane-specific adaptive beams to facilitate tracking the corresponding airplane;
   wherein the airplane-specific adaptive beams use antenna weights that are dynamically adapted to a position of the corresponding airplane in conjunction with tracking the airplane.

2. The ground-based communication system according to claim 1, further comprising
   a gateway configured to connect the at least one ground-based base station to a core network.

3. An airplane equipment for providing in-flight broadband mobile communication services to an airplane, comprising:
   at least one antenna configured to exchange user data with
      a ground-based communication system having a ground-based base station,
   a transceiver unit connected to the at least one antenna and configured to handle air-to-ground and ground-to-air communication with the ground-based base station,
   an inside-airplane communication system configured to distribute the user data to and from terminals within the airplane, and
   an inter-communication unit for communication between the transceiver unit and the inside-airplane communication system,
   wherein the ground-based base station is configured to use two-dimensional-beamforming to generate at least one beam to define at least one cell that forms a three-dimensional space above and around the ground-based base station, configured to serve the airplane within the at least one cell using spatial-division multiple access (SDMA), and configured to track the airplane using the at least one beam generated by the two-dimensional-beamforming;
   wherein the at least one beam generated by the two-dimensional-beamforming comprises airplane-specific adaptive beams to facilitate tracking the airplane;
   wherein the airplane-specific adaptive beams use antenna weights that are dynamically adapted to a position of the corresponding airplane in conjunction with tracking the airplane.

4. The airplane equipment according to claim 3, wherein the at least one antenna is arranged outside a hull of the airplane and the inside-airplane communication system is arranged inside the hull of the airplane.

5. The airplane equipment according to claim 3, wherein the at least one antenna includes a mechanically steered directive antenna or a two-dimensional beamforming antenna array.

6. The airplane equipment according to claim 3, wherein the inside-airplane communication system includes an airborne wireless communication system which comprises
   at least one airborne base station for generating a cell inside the airplane.

7. The airplane equipment according to claim 6, wherein the airborne wireless communication system is compatible with at least one wireless communication standard of a group comprising GSM, UMTS, and LTE.

8. The airplane equipment according to claim 3, wherein the inside-airplane communication system includes a WLAN system.

9. The airplane equipment according to claim 3, wherein the inside-airplane communication system comprises
   a plurality of airplane-operator-owned terminals installed inside the airplane.

10. The airplane equipment according to claim 3, wherein the inside-airplane communication system comprises
    a relay station.

11. The airplane equipment according to claim 3, wherein the airplane equipment is configured to perform Doppler compensation and/or frequency translation of the signals received and transmitted by the at least one antenna using airplane movement data.

12. The airplane equipment according to claim 3, wherein the transceiver unit is configured to exchange multiplexed data with the ground-based base station.

13. A method for providing in-flight broadband mobile communication services, comprising:
    performing two-dimensional-beamforming to generate at least one beam from an antenna element array of a ground-based base station, wherein the at least one beam defines at least one cell forming a three-dimensional space above and around the ground-based base station;
    serving an airplane in the at least one cell from the ground-based base station using spatial-division multiple access, SDMA; and
    tracking the airplane from the ground-based base station using the at least one beam generated by the two-dimensional-beamforming;
    wherein the at least one beam generated by the two-dimensional-beamforming comprises airplane-specific adaptive beams to facilitate tracking the airplane;

wherein the airplane-specific adaptive beams use antenna weights that are dynamically adapted to a position of the corresponding airplane in conjunction with tracking the airplane.

14. The ground-based communication system according to claim 1, wherein the at least one beam generated by the two-dimensional-beamforming includes a grid-of-beams for which selection of a preferred beam from the grid-of-beams is performed and repeated over time in conjunction with tracking the corresponding airplane.

15. The ground-based communication system according to claim 1, wherein the ground-based base station is configured to perform Doppler compensation and/or frequency translation of the signals received and transmitted by the at least one antenna array using airplane movement data.

16. The airplane equipment according to claim 3, wherein the at least one beam generated by the two-dimensional-beamforming includes a grid-of-beams for which selection of a preferred beam from the grid-of-beams is performed and repeated over time in conjunction with tracking the airplane.

17. The airplane equipment according to claim 5, wherein the corresponding mechanically steered directive antenna or two-dimensional beamforming antenna array is configured to track the ground-based base station.

18. The airplane equipment according to claim 11, wherein the airplane movement data is received by the airplane equipment from a GPS receiver or navigation system of the airplane.

19. The ground-based communication system according to claim 1, wherein the ground-based base station is configured to exchange multiplexed data with the at least one airplane.

20. The method according to claim 13, wherein the at least one beam generated by the two-dimensional-beamforming includes a grid-of-beams for which selection of a preferred beam from the grid-of-beams is performed and repeated over time in conjunction with tracking the airplane.

21. The method according to claim 13, wherein the ground-based base station is configured to perform Doppler compensation and/or frequency translation of the signals received and transmitted by the at least one antenna array using airplane movement data.

22. The method according to claim 21, wherein the airplane movement data is generated by a GPS receiver or navigation system of the airplane and received by the ground-based base station from the airplane.

* * * * *